Patented Jan. 14, 1930

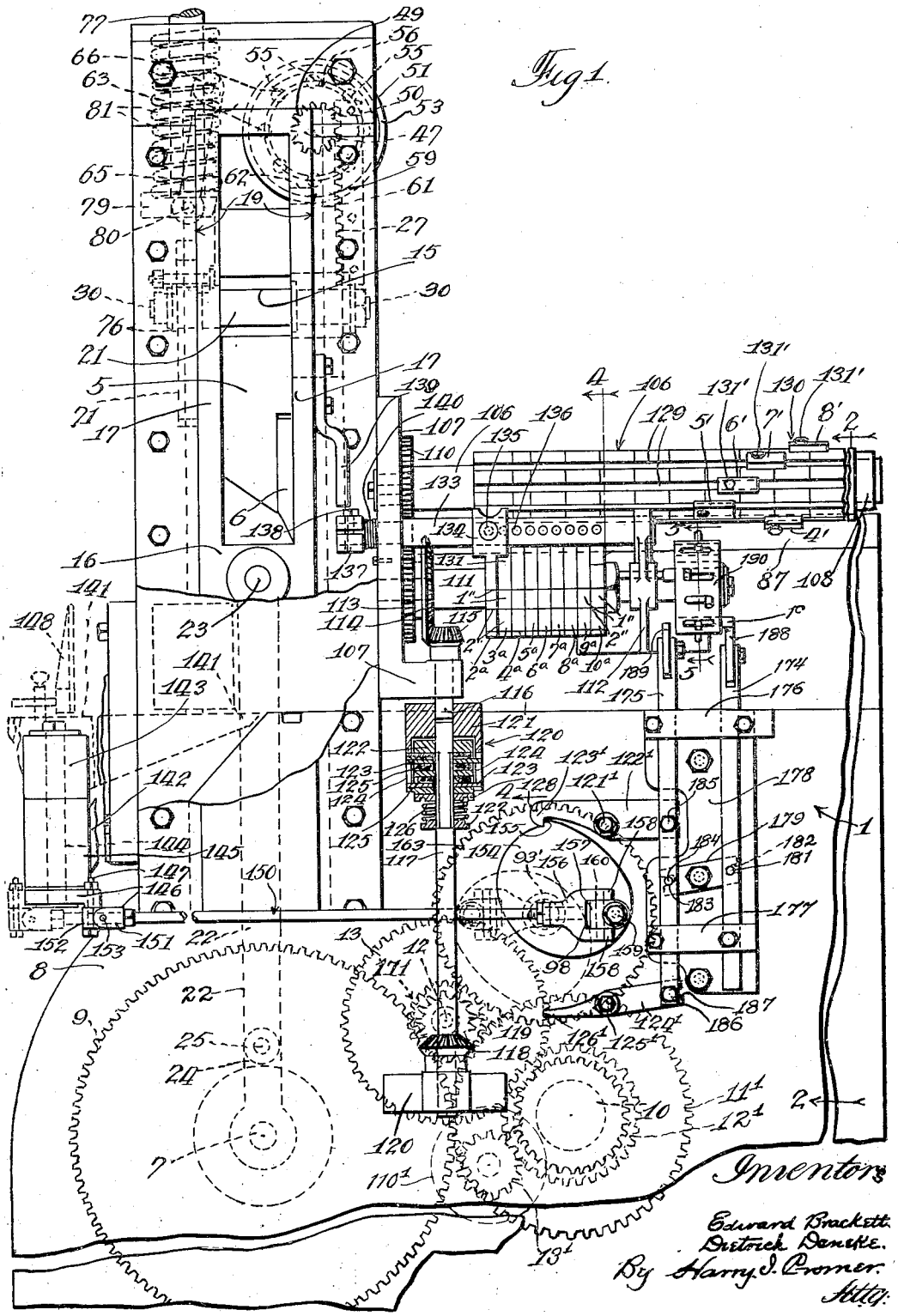

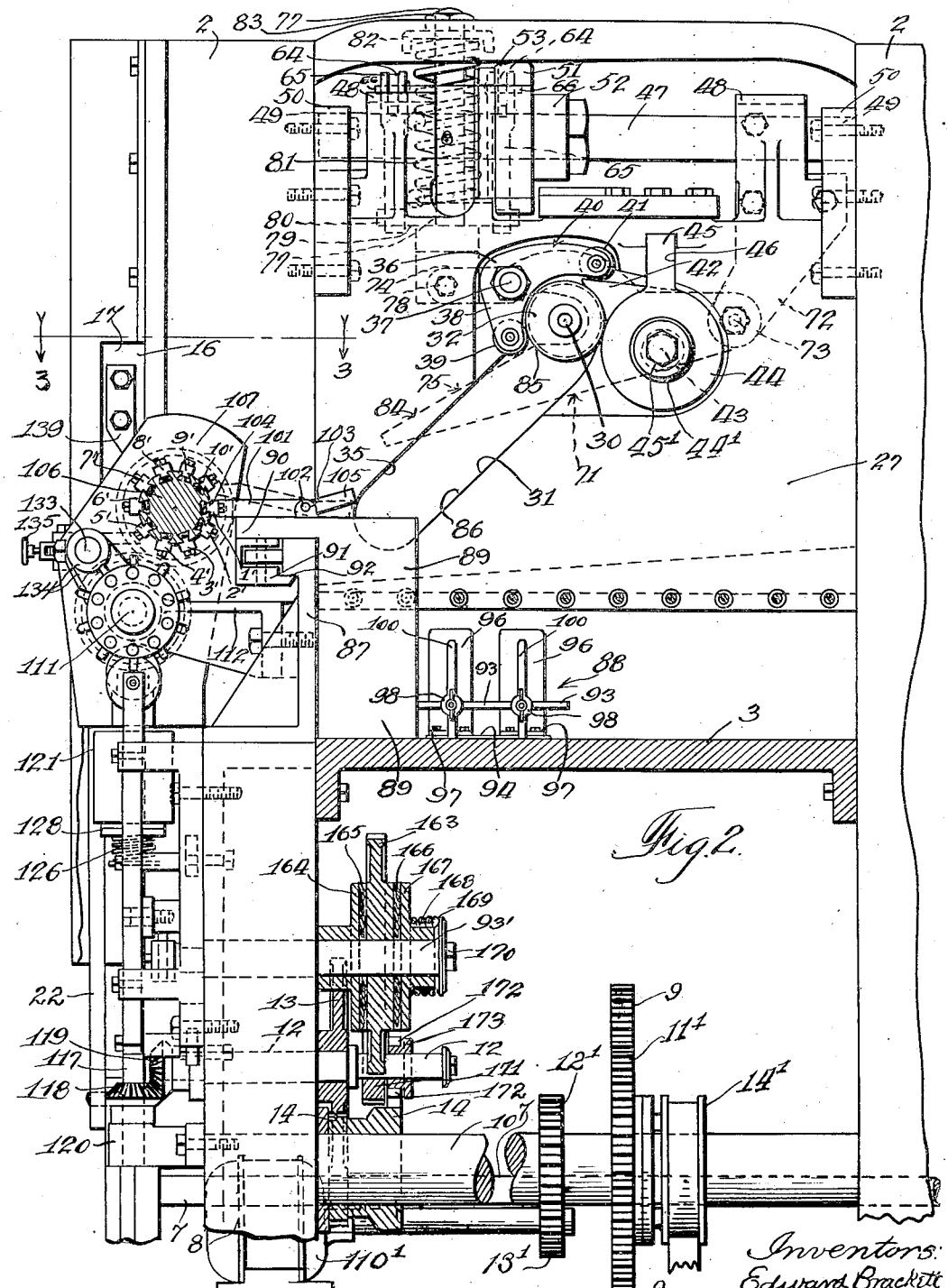

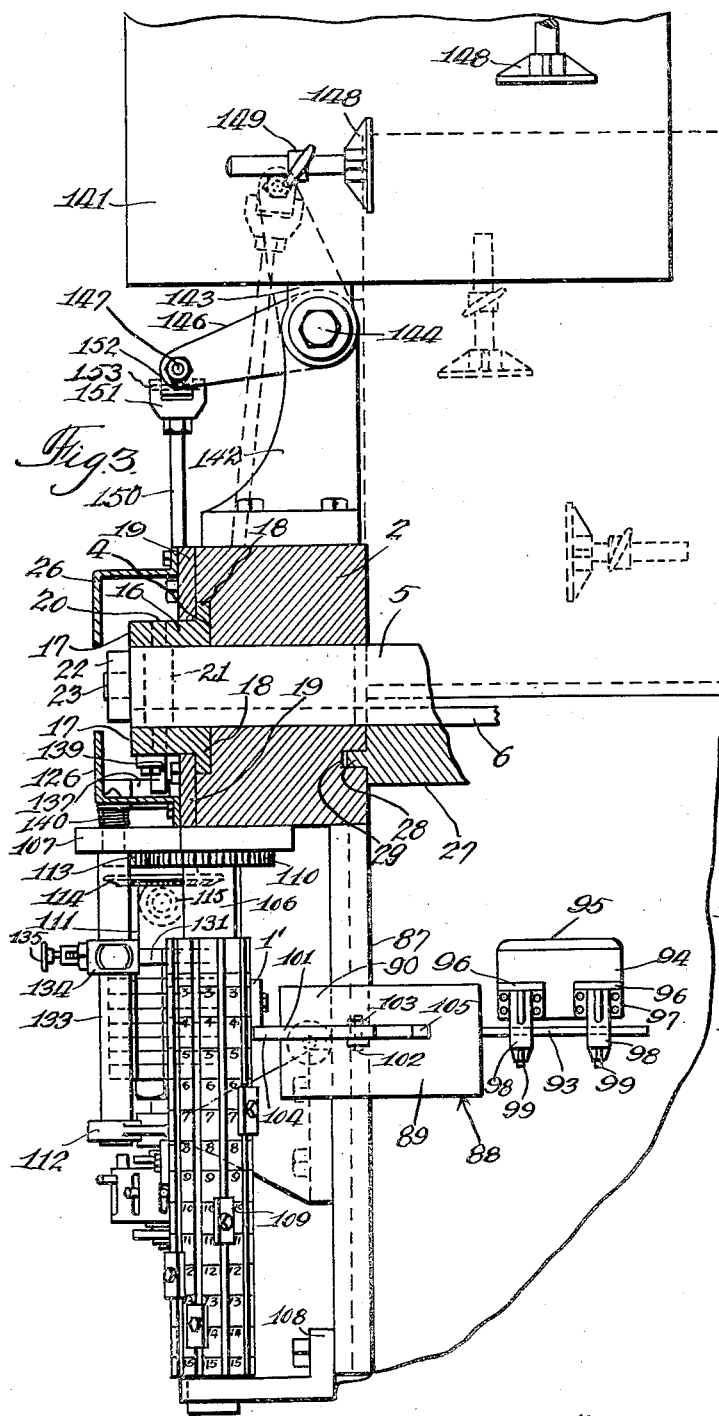

1,743,421

UNITED STATES PATENT OFFICE

EDWARD BRACKETT AND DIETRICH DANEKE, OF TOPEKA, KANSAS

PAPER CUTTING AND TRIMMING MACHINE AND GAUGE AND GAUGE-STOP MECHANISM THEREFOR

Application filed September 16, 1927. Serial No. 219,999.

The invention relates to paper-cutting machines or trimming machines and gauge and gauge-stop mechanism therefor, of the type having a knife, knife-operating means and a feed table, and having a movable paper-positioning gauge, and movable gauge-stop mechanism adapted to be automatically moved into and out of position to operatively engage and release the movable gauge, to stop and permit the movement of the same, for positioning the paper to be operated on.

The principal object of the invention is to provide a simple, economical and efficient paper-cutting or trimming machine, and more particularly to provide a machine having a knife, knife-operating means and a feed-table, with improved paper-positioning gauge and gauge-stop mechanism, comprising movable gauge-stopping means, or a series of gauge-stops provided with actuating means adapted to be connected with a source of power, such as a motor-driven shaft, for positively actuating the movable gauge-stopping means or gauge-stops, and provided with detent mechanism or pawl and ratchet mechanism adapted to be connected with the actuating mechanism and with the movable gauge-stopping means, for holding the same against the action of the positively driven actuating mechanism, in combination with tripping means adapted to automatically release the detent mechanism and permit the positive operation of the movable gauge-stopping means concurrently with any desired pre-determined stroke or strokes of the knife.

A further object of the invention is to provide a paper-cutting or trimming machine having improved gauge mechanism and adjustable gauge-stops, and gauge-stop positioning and operating mechanism operatively connected with the knife and knife-operating mechanism and adapted to be operated in predetermined relation to successive operations or any desired pre-determined stroke or strokes of the knife, and to provide paper-carrier or delivery mechanism operatively connected with the gauge-stop positioning and operating mechanism and with the knife and knife-operating mechanism, for receiving and delivering or carrying away paper that has been operated upon by the knife.

Other and further objects of the invention will appear from the following description and claims, and from an inspection of the accompanying drawings which are made a part hereof.

The invention consists in the features, combinations, details of construction, and arrangement of parts herein described and claimed.

In the accompanying drawings:—

Figure 1 is a view in side elevation of an improved paper-cutting or trimming machine having an upwardly and downwardly movable knife and knife-operating mechanism, and provided with adjustable gauge mechanism and gauge-stop positioning and operating means operatively connected with the knife and knife-operating mechanism, and having a carrier table located back of the knife and provided with automatic carrier-table operating and releasing means operatively connected with the gauge-stop positioning and operating mechanism, all constructed and adapted to operate in accordance with this invention;

Fig. 2 is a view in transverse vertical section taken on line 2—2 of Fig. 1, looking in the direction indicated by the arrows, and showing all of that portion of a paper-cutting machine which is located above the level of the feed table in front elevation, with a portion of one of the side frames broken away;

Fig. 3 is a detail plan view of the gauge-stop mechanism and gauge-stop positioning and operating means and paper-positioning gauge, for positioning the paper with respect to the knife and paper-holding clamp, and showing the means for operatively connecting the gauge-stop positioning and operating mechanism with the knife and knife-operating mechanism, and showing the paper carrier or delivery table back of the knife, and the means for operatively connecting the same with the gauge-stop positioning and operating means, with one of the upright side frames of the machine shown in horizontal section and in supporting engagement with the knife bar and paper-engaging clamp, with parts of the knife bar, clamp and feed table broken away and omitted;

Fig. 4 is an enlarged detail view in transverse section taken on line 4—4 of Fig. 1, looking in the direction indicated by the arrows, and showing the rotative gauge-stop supporting cylinder or member, and the adjustable stopping and releasing pawl and ratchet mechanism for stopping and releasing the rotative stop-supporting cylinder, and the driving mechanism for operating the same;

Fig. 5 is an enlarged detail view in transverse section taken on line 5—5 of Fig. 1, looking in the direction indicated by the arrows, and showing the adjustable means for operatively connecting the carrier table and its stopping and releasing and operating mechanism with the gauge-stop mechanism; and Fig. 6 is an enlarged detail view in vertical section taken through the vertical center of the rotative carrier table controlling or releasing mechanism comprising a series of adjustable tripping or releasing bosses mounted on a rotative head or support, which is connected with the shaft on which the pawl and ratchet mechanism, shown in Fig. 4, is mounted.

In constructing an improved paper-cutting and trimming machine provided with paper-positioning gauge mechanism and gauge-stop positioning and operating mechanism constructed and adapted to operate in accordance with this invention, a main frame 1 is provided having a pair of upright knife-supporting and clamp-supporting side frame members 2, 2 which project upward on opposite sides of a feed table or bed 3, which is upon and forms a part of the main frame. Each upright side frame member 2 is provided with a vertical guiding slot 4, which is adapted to admit and slidably support, and to permit the upward and downward movement of a horizontal knife-supporting bar 5 and knife 6 fixed to said knife-supporting bar, within said upright slots, and between and in sliding engagement with the opposed parallel upright side margins of said slots or ways.

The knife bar is operatively connected with suitable knife-operating mechanism, which may be of any desired ordinary and well-known or suitable form, and which, in the form of the device shown in the accompanying drawings, comprises a knife-operating crank shaft 7, which is rotatively mounted in suitable lower side frame portions 8 of the machine frame. The crank shaft 7 is operatively connected with a suitable source of power, such, for example, as an electric motor (not shown), by suitable shaft and gear mechanism which, by preference, includes a spur gear wheel 9 fixed to the crank shaft 7 and operatively connected with a motor-driven shaft 10 by means of a toothed gear wheel 11' on and rotative with the shaft 10 and in toothed engagement with said wheel 9. The shaft 10 is connected with the motor or source of power —10'— by suitable gears including a gear wheel 12' on the shaft 10 and suitable gear and clutch mechanism which may be of any ordinary and well known or suitable form adapted to enable the shaft 10 to be connected with and disconnected from the motor or source of power, as desired.

The knife bar 5 is provided at each end with a horizontal slot 15. And at each end of the knife bar and in position to straddle and move upward and downward therewith, is a movable knife-supporting and operating frame or sliding shoe 16 having upright side flanges 17 which form the side walls of a vertical slot through which the slotted knife-bar extends, and having upright guiding side flanges 18 which project at an angle to the upright flanges 17 and are slidably supported and held in vertical guiding grooves or ways in the corresponding side frame members 2 by means of upright guiding strips 19 each of which is fixed to a corresponding upright side frame member 2 in position to slidably engage and hold a corresponding upright flange 18 of a knife-supporting shoe 16 in its proper groove. The knife is thus raised and lowered by the upwardly and downwardly movable shoes 16 which are connected with the knife bar and with the crank shaft 7 by means of horizontal pins and rollers 20 and 21 mounted in the shoes 16, and upright connecting rods or pitmen 22 located at opposite ends of the knife bar and connected with the shoes 16 and crank arms 24 at the opposite ends of the crank shaft 7, as hereinafter more particularly described. (See Fig. 1, 2 and 3).

Each of the slidable knife-supporting frames 16 is connected with the adjacent horizontally slotted end portion of the knife 5 by means of a horizontal transverse pin 20 which extends through the corresponding end slot 15 in the knife-bar and has its opposite ends anchored in the upright webs 17 of the adjacent sliding frame or shoe 16. And each pin 20 has an anti-friction roller 21 thereon which engages the inner margins of the slot 15 through which the pin extends.

Each upwardly and downwardly movable knife-supporting frame or shoe 16 is operatively connected with the crank-shaft 7 by means of an upright connecting rod or pitman 22, the upper end of which is pivotally connected with the lower extremity of the corresponding shoe 16 by means of a pin 23, and the lower end of which connecting rod is operatively connected with the crank-shaft 7 by means of a crank 24 fixed to said shaft, and the crank pin or wrist pin 25 on said crank and extending through a suitable opening in the lower end of said connecting rod.

Side shields 26 are fixed to the upright frame members 2 for protecting the shoes 16 and other moving parts, and said shields are partly broken away for purposes of illustration.

A paper-engaging clamping member or plate 27 is mounted in front of and in parallel relation to the knife-supporting bar and knife, and is provided with marginal portions or upright guiding flanges 28 on its opposite vertical side margins, which are slidably mounted in suitable upright guiding grooves or ways 29 in the inner faces of the adjacent stationary upright side frame members 2. (See Fig. 3.)

This paper-engaging clamping member 27 is operatively connected with the knife-bar 5 by suitable connecting means which, in the form shown in the drawings, comprises a horizontal stub-shaft 30 which is anchored in and in fixed relation to the knife-bar and projects forward and rearward beyond the knife-bar. The forward end of the stub-shaft 30 extends through an inclined slot 31 in the upwardly and downwardly movable paper-engaging clamp or clamping member 27, and an anti-friction roller 32 is mounted on said forward end of the stub-shaft 30 with its periphery between and in engagement with the parallel inclined walls of the inclined slot 31. The upper extremity of the inclined slot 31 is, by preference, curved upward relatively to the parallel inclined walls of said slot. And it will be readily understood by those skilled in the art that the upward movement of the knife-bar will carry upward with it the clamping member 27 when the roller 32 on the stud or stub-shaft 30 is in engagement with the upper end of the inclined slot 31 in said clamping member, and that said connection between the knife-bar and said clamping member thus furnished by the stub-shaft and inclined slot will permit the clamping member 27 to move downward with the knife-bar and knife until said clamping member engages the top of the paper to be operated upon and clamped or held in place beneath the knife. But, as soon as the downward movement of the clamping member 27 is stopped by the paper thus held in position by the clamp, the further downward movement of the knife-bar and knife with the stub-shaft 30 movable in the inclined slots, will cause the knife to move endwise and downward at an incline corresponding to the inclination of the slot, so as to give the knife the shearing movement while in cutting engagement with the paper or material clamped or held in place by the clamping member 27.

Suitable shock-absorbing mechanism is provided for minimizing the shocks which would otherwise occur when the stub-staft 30 reaches the limit of its upward movement in the inclined slot. For this purpose a tripping and shock-absorbing lever 36 is pivotally mounted on the paper-engaging clamp member 27 by means of a pivot pin 37, and is provided with a lever arm 38 having an anti-friction roller 39 thereon adapted to normally engage the roller 32 on the stub-shaft 30, in the inclined slot 31. The lever member 36 has an upper lever arm 40 which is provided with an anti-friction roller 41 normally located above or beyond the upper extremity of the path of movement of the stub-shaft 30 and roller 32, and adapted to engage a rocking arm or cushioning member 42, which is pivotally supported upon a pivot 43, and held in place by a spring-pressed cover plate 44. The cover plate 44 has a projecting radial arm 45 which extends into a recess 46 in the clamping member 27, for preventing the rotation of the cover plate and holding it in proper operative position.

An upwardly and downwardly movable rotative clamp-supporting shaft 47 extends through suitable openings or bearings in upright bearing brackets or arms 48 which are fixed to and project upward from the upper edge of the clamp 27, and is provided at its opposite ends with pinions 49 which are in toothed engagement with adjacent stationary upright toothed racks 50 fixed to the inner margins of the corresponding stationary upright frame members 2 already described. This rotative shaft is thus adapted to support and to move upwardly and downwardly with the clamp 27. The rack and pinion mechanism is thus adapted to cause the shaft to rotate in one direction during the downward movement of the shaft and the clamping mechanism supported thereby, and to rotate in an opposite direction during the upward movement of the same. It will thus be readily understood that by locking the shaft against rotation when the shaft and clamp have reached the limit of their downward movement, with the clamp in clamping engagement with the paper, the clamp may be releasably secured or locked in such lowered paper-engaging clamping position, and that, by releasing and permitting the rotation of the shaft in the direction in which it would rotate in its upward movement, the clamp may be released.

Suitable means is provided for thus automatically locking and releasing the clamp-supporting upwardly and downwardly movable shaft 47, and thereby automatically locking and releasing the clamp. And means is also provided for operatively connecting the clamp and clamp-operating and locking and releasing means with the knife-bar or knife and knife-operating mechanism, all of which will be found fully illustrated and described in a co-pending application Serial No. 219,998, filed by the applicants herein September 16, 1927 for improvements in paper-cutting and trimming machines, and clamping mechanism therefor.

Briefly described, the locking and releasing mechanism, for automatically locking and releasing the clamp-supporting shaft 47 and clamp 27, and the means for operatively connecting the clamp and clamp-operating and releasing means with the knife bar or knife and knife-operating mechanism, is constructed as follows:

A fixed clutch member or ratchet member 51 is mounted upon and in fixed relation to the upwardly and downwardly movable clamp-supporting shaft 47. This outer clutch member or ratchet member 51 is, by preference, annular and has a hub 52 which is fixed to the shaft 47, and an annular peripheral flange or rim 53 the inner wall of which forms a circular track or race for a series of rollers 55, which are mounted in and adapted to travel circumferentially of and within the annular flanged portion or race thus formed.

An inner movable rocking clutch member or cam 56 is loosely mounted on the shaft, and its annular main body portion extends within the annular space inside of the annular flange 53 of the outer or fixed clutch member 51, and between the rollers 55 and the shaft, so that the peripheral cam faces on the annular inner cam member 56 are adapted to engage and release the rollers 55.

An intermediate annular cage member 59 loosely encircles the inner cam or clutch member 56 and has integral segmental sections (not shown) which extend between the rollers 55 for holding them in properly spaced apart rotative relation to each other and to the inner and outer clutch members 56 and 51. The said intermediate annular roller-cage member 59 has a projecting peripheral shoulder or stop 61 which is adapted to engage a projecting stop 62 on the upper margin of the paper-engaging clamp member 27, for limiting the rotation of said cage member in one direction.

A ratchet lever or clutch-operating and releasing lever 63 is loosely mounted on the shaft 47 adjacent to and in position to be rigidly secured to the end surface of the inner cam member 56, and the projecting arm portion of said lever 63 is forked so as to form a pair of integral forked lever arms 64 the outer ends of which are connected with the upper ends of depending links 65 by means of pins 66, said links being operatively connected with the stub-shaft 30 on the knife-bar by suitable connecting means which will be hereinafter briefly described, and said operating lever being operatively connected with the intermediate roller-cage member 59 by suitable resilient connecting means (not shown).

A clutch-operating or ratchet-operating and releasing lever 71 is pivotally supported upon or connected with the paper-engaging clamp 27 and is movable upward and downward with said clamp, but on the opposite or rear side of the knife bar and knife.

For this purpose, a rear depending bracket arm 72 is fixed to one of the upper bracket arms 48 on the upper edge and at or near one end of the clamp 27. The bracket thus formed by the bracket members 72 and 48 extends over the top of or straddles the knife bar 5, so as to support the clutch operating lever 71 back of the knife bar, and upon and in pivotal relation to the lower extremity of said bracket member 72 to which the lever 71, for operating and releasing the clutch or ratchet mechanism on the shaft 47, is pivotally attached by means of a pivot pin 73. (See Figs. 1 and 2.)

The pivoted clutch-operating or ratchet-operating and releasing lever 71 is in the form of a forked lever having an upper forked arm 74 and a lower forked arm 75, which are spaced apart and adapted to admit therebetween and to operatively engage an anti-friction roller 76 on the rear extremity of the stub shaft 30 already described, said stub shaft being anchored in the knife-bar. The upper forked arm 74 of the forked lever 71 is connected with the forked lever arms 64 of the clutch or ratchet operating and releasing lever 63, by means of an upright connecting rod 77 which is pivotally connected at its lower extremity with the outer swinging end of said upper lever arm 74 by a pivot pin 78. And a cross-head 79, pivotally connected with the lower ends of and supported by the depending links 65, already described, by projecting end bosses 80 on said head and which extend into suitable openings in the lower extremities of said links 65, supports a heavy compression spring 81 which encircles the upright rod 77 and is interposed between the upper face of said cross-head 79 and a washer 82 on the upper extremity of the connecting rod. The washer is held in position on the upright rod by means of one or more nuts 83. And the rod extends through an opening in the cross-head 79.

A yielding connection is thus formed between the upper forked arm 74 of forked lever 71, and the forked arms 64 of the clutch-operating or ratchet-operating and releasing lever 63 on the rotative shaft 47 already described.

The lower forked arm 75 of the clutch or ratchet-operating or releasing member 71, located back of the knife, has an upper roller-engaging surface or margin 84 which is straight and extends from a roller-engaging shoulder 85 to the lower outer end of said lever arm. (See Fig. 2.) The downward movement of the knife-bar 5 and stub-shaft 30 with the antifriction roller 76 from the position in which said parts are shown in Fig. 2, or raised position, to lowered position, will thus cause the roller 76 to engage the shoulder 85 on the lower forked arm 75 of the forked lever 71 and move said arm 75 down about its axis, formed by the pivot pin 73, into a lowered locking position in which the upper margin 84 of the forked arm 75 will be flush with the inclined inner bottom margin 86, or in the same inclined plane with said margin 86 of the inclined slot 31 in the paper-engaging clamp 27 on the front side of the knife-bar. From the foregoing, it will be readily understood by those skilled in the art that the shaft 47 is always free to rotate in one direction during the downward movement of said shaft and the paper-engaging clamping member 27, and is releasably held or locked against rotation in an opposite direction during such downward movement and at the termination of said movement.

An improved gauge mechanism or paper-positioning mechanism—which includes, by preference, a movable gauge and a series of adjustable gauge-stops, and means for positioning and operating the gauge-stops for controlling the position of the paper-positioning gauge, and means for operatively connecting the gauge-stop positioning and operating mechanism with the knife-bar and knife or knife-operating mechanism—is provided and constructed in accordance with our invention, as follows:

A stationary upright gauge and gauge-guide 87 is mounted upon or adjacent to one side of the feed table 3 and in position to extend at right angles to the knife 6, the upright side face of said guide, which faces toward the feed table, being perpendicular to the horizontal flat top face of the feed table and at right angles to the knife. A movable or adjustable transverse paper-positioning gauge 88 is mounted in slidable engagement with and adapted to be guided by said stationary upright gauge and gauge-guide 87 and in position to extend at right angles to the latter and transversely over or part way across the top of the feed table and in parallel relation to the knife. The movable or adjustable gauge 88 is constructed, by preference, as follows:

A guiding head 89, which forms part of said movable gauge 88, is mounted in sliding engagement with the upright straight side face of the stationary gauge-guide 87, and has a transversely extending top flange 90 which projects over the top of the stationary guide 87, and to the under side of which is secured a bottom flange 91 which projects beneath the transverse longitudinal flange or shoulder 92 on the outside of the upper margin of the stationary gauge-guide 87, as shown in Fig. 2.

A horizontal bar or rod 93 is secured at one end to the head 89 and projects therefrom transversely over the feed table 3. And one or more adjustable gauge members are provided and adjustably secured to this transverse horizontal bar or rod 93, by preference as follows: Each of said adjustable gauge members comprises, by preference, a flat bottom member 94 made of thin sheet steel and having a sharp edge 95 on the margin nearest to the knife. Mounted upon each of these bottom plates 94 and supported in rigid relation thereto is one or more upright gauge-back members 96, each of which has a bottom flange 97 secured to the flat bottom plate and forming a strong and rigid connection between the bottom plate and said gauge-back members. Each of the gauge-back members 96 has a forwardly projecting boss 98 having a transverse opening therethrough for admitting the horizontal bar or rod 93 which extends through said openings and forms a support upon which said bosses, and the bottom plate connected therewith, are adapted to be secured in different adjusted positions. Each boss 98 has a central end opening in threaded engagement with which is mounted a set screw 99 which is adapted to be screwed into and out of securing engagement with the bar or rod. The bosses or projecting arms 98 may be rigidly attached to or formed in one integral piece with the upright gauge back members 96, or they may be adjustably secured to or mounted upon said upright gauge-back members 96, each of which has an upright slot 100 in which the corresponding projecting arm or boss 98 may be secured in any desired adjusted position.

There may be as many bottom gauge plates 94 with their upright gauge-back members 96 adjustably connected with the same horizontal bar 93 as may be desired, the upright paper-engaging faces of the upright gauge-back members 96 being flush or in the same vertical plane with the upright flat face of the head 89 which faces toward the knife.

A pivoted tripping finger or stop arm 101 is pivotally mounted upon the sliding head 89 by means of a pivot 102, which is anchored between upright lugs 103 on said sliding head. The outer end 104 of said tripping finger or arm projects transversely beyond the outer margin of the head 89, and the inner end 105 of said finger extends upward at an incline away from the top face of the head, and is adapted to be pressed downward by the hand of the operator to tilt the outer projecting end upward when desired.

A horizontal rotative gauge-stop supporting and positioning cylinder or shaft 106 is rotatively mounted adjacent to and in position to extend in parallel relation to the path of movement of the gauge 88 and outer end 104 of the tripping finger or arm 101 on the gauge head 89. This cylinder or shaft 106 is supported at one end upon a frame arm or bracket 107 which is attached to the adjacent upright frame member 2, and at the opposite end by a suitable bracket 108, which may be attached to the frame of the machine by any suitable securing means, and may be of any ordinary and well-known or suitable form of bracket adapted to support and permit the free rotation of the forward end of said rotative gauge-supporting cylinder or shaft 106.

Means is provided for rotating or operating the gauge-supporting cylinder or shaft 106 and for operatively connecting the same with the knife and knife-operating mechanism, and with suitable stopping and releasing ratchet mechanism, for positioning or controlling the stopping and releasing of the gauge-stop supporting cylinder or shaft 106, with the adjustable gauge-stops 130 thereon.

For this purpose a spur gear wheel 110 is fixed to and rotative with the rear end of said shaft or cylinder 106. A ratchet-supporting shaft 111 is rotatively mounted in parallel relation to the gauge-stop supporting shaft 106 and has its rear end journaled in the bracket arm 107 already described, and its forward end journaled in the outer extremity of a supporting bracket 112 which is secured to the machine frame in position to support the forward end of said ratchet-supporting shaft 111 as shown in Figs. 2 and 3. (See also Fig. 1.) A spur gear wheel 113 is fixed to the ratchet-wheel supporting shaft 111, and is in toothed engagement with the mating wheel 110 on the gauge-stop supporting shaft 106, so that said shafts 106 and 111 will rotate synchronously. A bevel gear wheel 114 is fixed to the ratchet-wheel supporting shaft 111, and a beveled pinion 115 is fixed to the upper section 116 of an upright driving shaft which is journaled in the bracket 107, the lower section 117 of said upright driving shaft being operatively connected with the driven shaft 12, herein described, by means of a beveled gear wheel 118 fixed to said lower shaft section 117, and in toothed engagement with a beveled gear wheel 119, on said shaft 12. The lower end of the sectional shaft 117 is journaled in a suitable bearing 120 which is attached to the machine frame. (See Fig. 1.)

The upper section 116 and lower section 117 of the upright driving shaft comprising said sections, are operatively connected, by preference, in such way that the lower section 117 is permitted to rotate constantly and without interruption while the machine is in operation, and the upper section 116 is permitted to be stopped and released, so as to rotate intermittently as desired.

In order to connect said shaft sections in a simple and efficient manner a friction clutch 120 is provided, which may be of any ordinary and well-known or suitable form adapted to automatically connect and release said shaft sections as required. The clutch shown in the accompanying drawings comprises an outer upper clutch member 121 which is fixed to the upper shaft section 116, a lower inner clutch member 122 fixed to the lower shaft section 117 and rotative therewith, friction plates 123 having peripheral projections or bosses slidably mounted in longitudinal peripheral slots or grooves 124 in the outer upper clutch member 121, so as to rotate with said outer clutch member, and intermediate friction plates 125 attached to and adapted to rotate with, and to be moved longitudinally of the lower shaft section 117, so as to provide a variable frictional engagement between the friction plates thus connected with and adapted to rotate with the outer clutch member 121, and the friction plates which are connected and adapted to rotate with the lower inner clutch member 122 and lower shaft section 117. A helical compression spring 126 encircles the lower shaft section 117 and is interposed between a head 127 fixed to said lower shaft section and a bottom inner clutch member 128 which encircles said lower shaft section and engages and is adapted to move upward and downward longitudinally of said lower shaft section with the lowermost friction plate of the series of friction plates above described which form the frictional connection between the outer clutch member 121 and inner lower clutch member 122.

The rotative cylindrical gauge-stop positioning and operating cylinder 106 is provided with a series of gauge-stop guides or longitudinal peripheral guiding grooves 129, and with a corresponding series of adjustable peripherally projecting gauge-stops 130 each slidably mounted in and in longitudinally adjustable relation to a corresponding longitudinal groove 129. The grooves are, by preference dove-tailed, or narrower at the top than at the bottom, and have inclined side walls; and each of the gauge-stops 130, has a similarly tapered inner bottom tongue or base adapted to fit into and in slidable engagement with the inclined walls of the groove in which it is mounted, and each gauge-stop 130 is provided with a set screw 131' thereon and in screw-threaded engagement therewith and adapted to be screwed into and out of engagement with the longitudinally grooved cylinder 106, for releasably holding the gauge-stop in any desired pre-determined adjusted position into which it may be moved, for positioning or stopping the paper-positioning gauge 88 whenever the tripping finger or stop 101 located on the gauge head 89 comes into contact with such adjustable gauge-stop 130 as the paper-positioning gauge 88, with the paper to be operated upon, is moved toward the knife by the operator. The projecting end 104 of the tripping finger or stop 101 is, of course, tapered in one direction, or triangular in cross-section, so as to present an upwardly inclined face toward the gauge-stops 130 and pass by any stop which may be in the path of movement of the projecting end 104 of said tripping finger 101 when the latter is moved with the gauge head 89 and gauge 88 away from the knife.

There may be any desired number of adjustable gauge-stops 130, each mounted in adjustable or longitudinally movable relation to the rotative gauge-stop supporting cylinder or shaft 106, and the gauge-stops may be adjustably secured to the rotative support by any well known or suitable securing means. In the machine shown in the accompanying drawings, ten adjustable gauge-stops 130 are shown which are individually numbered 1', 2', 3', 4', 5', 6', 7', 8', 9', and 10', respectively, in the order in which they are arranged circumferentially of the rotative stop-supporting member or cylinder 106 and in which they pass into and out of the path of movement of or into and out of position to engage and stop the tripping finger or stop 101 on the gauge-head 89 of the paper-positioning gauge 88 already described.

Mounted on and in fixed relation to the rotative ratchet-wheel supporting shaft 111, already described, which shaft is directly connected and adapted to rotate synchronously with the rotative gauge-stop supporting and positioning member or cylinder 106, is a gauge-stop controlling and releasing toothed ratchet wheel 131, which is formed, by preference, in sections each having a different number of teeth, each tooth corresponding with an individual gauge-stop 130, and with a corresponding cut or operation of the knife in making a predetermined cut when the paper to be operated upon is in a position which is determined or controlled by the position of such gauge-stop. The sections of the toothed ratchet wheel 131 are distinguished and individually numbered successively in their order, according to the number of ratchet teeth 132 thereon, 2ª, 3ª, 4ª, 5ª, 6ª, 7ª, 8ª, 9ª, and 10ª, respectively. (See Fig. 1, and Fig. 4.) The ratchet-wheel section 2ª has two ratchet teeth 1", and 2" thereon. The ratchet-wheel section 3ª has three ratchet teeth thereon, including teeth 1", and 2" and 3". The section 4ª has four teeth 1" to 4" inclusive; section 5ª has five teeth, 1" to 5" inclusive; wheel section 6ª has six teeth 1" to 6" inclusive; section 7ª has seven teeth, 1" to 7" inclusive; section 8ª has eight teeth, 1" to 8" inclusive; section 9ª has nine teeth, 1" to 9" inclusive, and the last ratchet-wheel section 10ª has ten teeth 1" to 10" inclusive. (See Figs. 1 and 4.)

A pawl-supporting and operating ratchet releasing shaft 133 is rockingly mounted in suitable bearings in the brackets 107 and 112 in parallel relation to the rotative ratchet-wheel supporting shaft 111 already described. And slidably mounted upon and in longitudinally adjustable relation to said rocking shaft 133 is a stopping and releasing pawl or finger 134, which is adapted to engage and stop or release the ratchet teeth of any desired or pre-determined ratchet-wheel section of ratchet-wheel 131, already described. The pawl 134 has, by preference, an annular body portion which encircles the rock shaft 133, and is provided with a set-screw or bolt 135, which may be in screw-threaded engagement with and is supported by the pawl 134, and is adapted to be inserted in any desired peripheral opening or recess 136 in said rock shaft 133, there being an opening or recess 136 for each section of said toothed ratchet member or sectional ratchet wheel 131, already described.

The rock shaft 133 has a tripping lever arm 137 fixed to one end thereof by means of a bolt 138, or other suitable securing means; and a tripping arm or finger 139 is fixed to an adjacent upwardly and downwardly movable knife-supporting and operating side frame 16, already described. A helical coil spring 140 encircles the rock shaft 133 and is operatively connected therewith, and with the tripping arm 137, in such a manner as to yieldingly and releasably hold the projecting end of the pawl 134 in engagement with the sectional toothed ratchet wheel 131, already described.

From the foregoing description it will be readily understood by those skilled in the art that the lower section 117 of the upright driven shaft comprising upper and lower sections 116 and 117 releasably connected by a friction clutch 121, will be in constant rotation when the machine is in operation, and that whenever the pawl 134 on rock shaft 133 engages a tooth on the sectional ratchet wheel 131, the upper section 116 of said upright shaft will be stopped while the lower section 117 will continue to rotate. It will also be readily seen that, when the pawl 134 is raised or operated so as to release the sectional ratchet wheel 131—for example, when the tripping finger 139 on the upwardly and downwardly movable knife-operating frame or shoe 16 moves downward with the knife and engages and trips the tripping arm 137 on the pawl-supporting rock shaft 133—the ratchet wheel 131 thus released, will be rotated, or partially rotated, and that its rotative movement will continue until stopped by the pawl 134 coming in contact with a tooth of said sectional ratchet wheel. It will also be readily seen that the rotation of the sectional ratchet wheel 131 will be stopped whenever the pawl 134 engages a tooth of said ratchet wheel, and in a position corresponding with the position of such tooth. It will also be obvious, in view of the foregoing, that the sectional ratchet wheel 131 will thus be intermittently operated and stopped as many times as there are ratchet teeth on the section of said ratchet wheel which is being operatively engaged, or stopped and released by the automatically operated pawl 134.

The rotative gauge-stop supporting and operating cylinder 106 with its stops 130 thereon, and the sectional ratchet wheel 131 are thus adapted to rotate intermittently in synchronous relation to each other and to the knife.

The gauge-stop positioning and operating mechanism herein described is intended and adapted to enable the operator to set the gauge mechanism my simply setting or adjusting the pawl 134 in position to operatively engage a pre-determined section of the sectional ratchet wheel 131, and by setting one or more of the adjustable gauge-stops 130 in the proper position or positions longitudinally of the gauge-stop supporting cylinder 106, so that the required stop or stops 130 will be automatically presented in the required pre-determined order in the path of movement of the pivoted stop 101 on the gauge head 89, for stopping the gauge 88 and the paper to be positioned thereby, in position to enable as many cuts to be made consecutively and in the required order, as may be desired, and repeated in cycles each consisting of a pre-determined number of individual cuts corresponding with the individual adjustable gauge-stops 130 employed.

For example, by setting the pawl 134 in position to engage section 2ª of the sectional ratchet wheel, having two teeth 1″ and 2″, and setting adjustable gauge stops 1′ and 2′ in position to control the position of the paper for two cuts to be embraced within a cycle, said adjustable stops will be presented in pre-determined order and repeatedly in the same order for as many desired cycles as may be required.

By setting the pawl 134 in position to operatively engage section 3ª, having three ratchet teeth 1″, 2″ and 3″, and setting the corresponding three adjustable gauge-stops 1′, 2′ and 3′ in the proper position longitudinally of the gauge-stop supporting cylinder 106, for controlling the position of the paper with respect to the knife for three cuts to be embraced within a single cycle, which is to be repeated as many times as may be desired, the three adjustable stops thus set will be presented successively in pre-determined order and synchronously with respect to corresponding pre-determined strokes of the knife, so that the required three cuts corresponding with the three gauge-stops employed, may be made repeatedly and in the same order for as many cycles as may be desired.

It follows, as a matter of course, that by setting the pawl 134 in position to operatively engage section 4ª, having four ratchet teeth, and setting the corresponding gauge-stops in their proper relatively adjusted position on the rotative gauge-stop supporting cylinder 106, cycles consisting of four cuts each may be repeated as many times as desired, and so on throughout the entire set of ratchet wheel sections from 2ª to 10ª inclusive, and throughout the entire set of adjustable gauge-stops from 1′ to 10′ inclusive.

In the machine shown in the drawings a carrier or delivery table is mounted back of and adapted to receive and carry cut paper from the knife, and carrier table operating means is operatively connected with the carrier table and with the knife operating means and adjustable gauge and gauge-stop mechanism, whereby the movements of the carrier table are regulated and coordinated with respect to predetermined movements of the knife and of the gauge-stop mechanism, so that the cut paper may be received upon the carrier table upon the completion of any desired pre-determined stroke or strokes of the knife, or between pre-determined operations of the knife, and carried from the knife upon the completion of any desired pre-determined stroke or strokes of the knife, or cuts corresponding with such strokes.

A carrier or delivery table 141 is pivotally supported upon the main frame of the machine back of the knife and adapted to swing into and out of position to receive and carry the cut paper from the knife and to deliver it at one side of the machine in position to be either removed from the carrier manually, or deposited upon a conveyor or other receptacle, which may be of any desired, ordinary or well-known or suitable form.

A suitable support for the carrier table 141 is provided which, in the form shown in the drawings, comprises a supporting bracket 142 located back of the knife and at one side of the main frame to which said bracket is secured by means of bolts or other suitable securing means. A laterally projecting arm or hinge member 143 fixed to and adapted to swing with the carrier, is pivotally supported upon an upright pivot pin or pintle 144, which pivot pin is rotatively mounted in a vertical bore or opening in an upright sleeve or socket member 145 which forms an integral part of the bracket 142. The upright pivot pin or pintle 144 is fixed at its upper end to the arm or hinge member 143 on the carrier table; and fixed to the lower end of said pin below the sleeve is a lever arm or crank arm 146. The crank arm 146 is provided with a crank pin 147 which is adapted to serve as a means for operating the crank and the upright pivot or crank shaft 144 which forms the vertical axis upon which the flat topped carrier table 141 is supported and adapted to swing. The carrier table is provided with a set of upright adjustable stops or gauges 148 which are adjustably mounted in suitable supports 149 fixed to the table and adapted to enable the stops 148 to be adjusted with respect to each other as desired.

A connecting rod 150 is operatively connected with the crank 146 by suitable connecting means which may be of any ordinary and well-known form. For example, a pair of pivotally connected connecting members 151 and 152 may be employed, one of said members 151 being secured to the end of the connecting rod and having forked arms between which the other connecting member or bearing block 152 extends, said bearing block being loosely mounted on the wrist pin 147 and connected with the forked connecting member by means of a horizontal pivot pin 153. The opposite end of the connecting rod 150 is operatively connected with the rotative shaft 93′ herein described, which shaft is provided with a crank arm or plate 154, by preference in the form of a segment of a circle and having a projecting stop-shoulder or detent 155 thereon adapted to be engaged and released by suitable stopping and releasing, or tripping mechanism, which will be more fully hereinafter described.

The connecting rod 150 is connected with the crank disk or escapement plate 154 by connecting members 156 and 157 which are pivotally connected by a vertical pivot pin 160, one of said connecting members being connected with said rod and having forked arms 158 which straddle the other member 157 attached to the crank pin 159 on said escapement plate 154.

The shaft 93′, on which the escapement plate 150 with its crank or wrist pin 159 is mounted, is thus operatively connected with the delivery table 141 located back of the knife.

Since the delivery table is to be operated intermittently and its movements are to be automatically controlled and synchronized or accurately timed with respect to any desired predetermined operations of the knife, and with respect to corresponding or correlated operations of the gauge-stops and the mechanism for positioning or operating the gauge-stops, for stopping the movable gauge in predetermined positions relatively to the knife, and relatively to previously selected or predetermined operations of the knife, it is very desirable that means be provided for operatively connecting the shaft 93′ with the constantly rotative shaft 12 which is constantly operatively connected with the pawl and ratchet mechanism and rotative gauge-stop supporting cylinder 106 for operating and controlling the movable gauge-stops 130, whereby the shaft 93′ for intermittently operating the delivery table, may be rotated intermittently, and the shaft 12 may be permitted to rotate constantly and to be constantly connected with the source of power when the machine is in operation.

For example, the intermittently rotative shaft 93′ is, by preference, provided with a spur gear wheel 163 loosely mounted thereon. A collar 164 is fixed to said shaft. A leather washer 165 is interposed between said collar and wheel; and a similar leather washer or friction disk 166 is interposed between said gear wheel 163 and a loose collar 167 which is loosely mounted on the end of the shaft 93′. And a compression spring 168, which is interposed between the collar 167 and an outer collar 169 held in place on the end of the shaft by a headed bolt 170, serves to hold the collars 164 and 167 and the gear wheel 163 and said washers in frictional engagement with each other. The gear 163 is thus releasably connected with the intermittently rotative shaft 93′. And the tension of the spring 168, which can be adjusted as desired, serves to maintain the required frictional connection between the said gear and shaft to insure the desired intermittent rotation of the shaft when it is automatically released by the escapement mechanism, and driven by said gear wheel 163, and to permit the automatic stopping of the shaft by the escapement mechanism, while the gear wheel 163 continues to rotate without interruption. The shaft 12 is operatively connected with the motor or source of power by means of a spur gear 13 fixed to the shaft 12, and a spur gear 14 keyed to and rotative with the shaft 10 and in toothed engagement with the gear 13, the shaft 10 being connected with the motor —110′— as already described. And the gear wheel 163 on shaft 93′ is releasably connected with the constantly rotative shaft 12 by means of an adjustable spur gear wheel 171 which is keyed to and rotative with, but movable longitudinally of said shaft 12 into and out of toothed engagement with the said gear wheel 163. A shifting yoke 172 having forked yoke arms in engagement with an annular peripheral groove 173 in the hub of the gear wheel 171, is mounted upon a suitable support which may be either a shifting rod or a pivoted lever (not shown). The shifting mechanism or yoke 172 is thus adapted to serve as a simple and convenient means for operatively connecting the gear wheel 163 with the gear wheel 171 on the shaft 12, and for disconnecting said gears and thereby connecting and disconnecting the shafts 93′ and 12.

The carrier table 141 and its actuating and controlling mechanism, including the intermittently rotative carrier-table actuating shaft 93′ and the escapement plate 154 fixed to said shaft, are operatively connected with the gauge-stop positioning and controlling mechanism, including the pawl and ratchet and tripping mechanism, and with the knife and knife-operating mechanism, by preference, as follows:

Pivotally mounted on a supporting pivot pin 121′ adjacent to the cam plate 154 is an upper escapement pawl or releasing and stopping lever 122′ having at one end thereof a hooked end portion 123′ which is adapted to be moved into and out of the path of movement of the peripheral shoulder or stop 155 on the rotative escapement plate 154, for automatically releasing and stopping the rotation of said escapement plate, and the shaft 93' on which the escapement plate is mounted. A similar lower escapement pawl or releasing and stopping lever 124' is pivotally mounted on a supporting pivot pin 125' adjacent to the bottom peripheral margin of the escapement plate 154, and has a plate-engaging releasing and stopping end portion 126' which is movable into and out of the path of movement of said peripheral stop 155 on said escapement plate, for releasing and stopping the rotation of said escapement plate and said shaft 93' at predetermined intervals alternately with respect to the releasing and stopping of the escapement plate and said shaft by the said upper pawl 122'.

Connected with the pawls 122' and 124' is a pair of upwardly and downwardly movable pawl-operating reciprocating plungers 174, 175, which are mounted in upright position parallel to each other in longitudinally slidable engagement with upper and lower plunger-supporting and guiding bearings 176 and 177.

The bearing members 176 and 177 are, by preference, mounted on a supporting plate 178 which is rigidly secured to the main frame of the machine. The plungers are thus slidably supported in parallel upright spaced-apart relation to each other. And a rocking lever 179 is pivotally mounted upon a horizontal supporting pivot pin or bolt midway between the upright plungers, one end of said pivoted lever being connected with the plunger 174 by means of a pin 181 on the plunger and extending into an end opening or notch 182 in said lever, and the opposite end of said lever being connected in a similar manner to the other plunger 175 by means of a pin 183 which is supported on said plunger and extends through an end notch or opening 184 in said lever. The plunger 175 nearest to the escapement plate, is directly connected with the upper pawl 122' by means of a pin 185 mounted on the plunger and extending through an elongated end opening or notch in said pawl. And said plunger 175 is connected in like manner with the lower pawl 124' by means of a headed pin or bolt 186 mounted in the lower end of said plunger and adapted to extend through an end opening or notch 187 in the adjacent end of said pawl. It will be readily understood from the foregoing that the downward movement of either plunger will cause the other to move upward, and vice versa. It will also be readily seen that the downward movement of the plunger 174 to the position in which it is shown in Fig. 1 will raise the plunger 175 to the position shown in said Fig. 1, and will move the lower pawl 124' to releasing position out of engagement with the escapement plate 154, and simultaneously move the upper pawl 122' into position to engage and stop the rotation of the released escapement plate 154 by engaging the shoulder 155 on said plate.

With the plungers and escape mechanism in the positions shown in said Fig. 1, the carrier table 141 will be in its outer retracted position as shown in full lines in Fig. 3.

It follows, of course, that the next operation of the plungers will cause the plunger 175 to be lowered and the other one, 174 to be raised, thus causing the pawl 122' to be released from engagement with the shoulder 155 on the escapement plate 154, and simultaneously causing the plate-engaging end of the lower pawl 124' to be raised into the path of movement of the shoulder 155, so as to stop the rotation of the escapement plate and the shaft 93' when the carrier table 141 swings inward to receiving position near the knife, as shown in broken lines in Fig. 3. Each downward movement of the plunger 174 will thus cause the carrier table to be released and permitted to swing outward to retracted or delivery position as shown in full lines in Fig. 3. And each downward movement of the plunger 175 will cause the carrier table and its actuating mechanism to be again released and the table to be swung inward to receiving position.

Plunger-operating means connected with the gauge-stop positioning mechanism is provided which is adapted to cause the plungers and carrier table to be operated automatically and in synchronous relation to predetermined operations of the knife and of the gauge-stop positioning mechanism, as follows:

The plunger 174 is provided with an anti-friction roller 188 rotatively mounted on a transverse horizontal axle between forked arms on and integral with the upper end of said plunger; and the plunger 175 is provided with a similar anti-friction roller 189 rotatively supported between upper forked arms on the upper end of said plunger, upon a horizontal axis. The horizontal axes of the rollers 188 and 189 are in the same vertical plane.

The upper ends of the plungers and the anti-friction rollers thereon are spaced apart and in the same vertical plane with and below the level of the axis of the ratchet-supporting shaft 111 already described. And a plunger-operating wheel or head 190 is fixed to and adapted to be intermittently rotated with and by means of said shaft 111 and provided with a plurality of plunger-engaging and operating members consisting of or comprising, by preference, ten longitudinally adjustable bosses or bolts $1^c$, $2^c$, $3^c$, $4^c$, $5^c$, $6^c$, $7^c$, $8^c$, $9^c$, and $10^c$, one for each correspondingly numbered adjustable gauge-stop 1' to 10' inclusive. It will also be noted that there is one of said bosses or plunger-operating bolts for each ratchet tooth 1″ to 10″ inclusive of the series of ten ratchet teeth on the ten-toothed section 10ᵃ of the sectional ratchet 131, and that said ratchet-teeth and said plunger-operating bosses or bolts are arranged in the same consecutive order, so that when any ratchet tooth 1″ is engaged by the pawl 134, a corresponding plunger-operating bolt 1ᶜ will be in position to either engage or pass without engaging the roller on the upper end of the raised or highest one of the pair of plungers 174, 175. Whether the plunger-operating bolt will engage the plunger roller or not will of course, depend upon whether the bolt is in its retracted or neutral position, or in plunger-engaging extended position. And when the plunger-operating bolts or any one or more of them are adjusted to extended plunger-engaging position on one side of the head or wheel 190 they will engage and operate the adjacent plunger provided it is in raised position in the path of movement of such bolt or bolts, but will pass the other plunger. When the plunger-engaging or operating bolts are in their central or neutral retracted position they will pass both plungers.

For convenience, the entire series of plunger-operating bolts 1ᶜ to 10ᶜ inclusive will be designated by the reference numeral 191. Each of said plunger-operating bolts 191 is, by preference slidably mounted in a bore or socket in the head or wheel 190, the entire series of said bolts being arranged in a circle around the axis of the shaft 111 and wheel 190, and with their axes parallel to each other and in parallel relation to the axis of the said shaft and wheel. Each bolt 191 is, by preference, provided with a projecting pin or boss 192 which projects from the longitudinal center of the bolt outward radially through an elongated peripheral slot 193 in the wheel. These radially projecting bosses are adapted to serve as convenient handles for use in adjusting the bolts. Each bolt is, by preference, provided with three peripheral notches 194, 195 and 196, each adapted to be engaged by a spring-pressed detent or ball 197, which is mounted in a central opening or socket 198 which communicates with the opening in which the adjustable bolt is mounted. Each ball 197 is held yieldingly in engagement with the notched bolt 191 by a compression spring 199. (See Fig. 6.)

From the foregoing it will be readily understood that each of the plunger-operating bolts is adjustable to central or retracted position, as shown at the top of Fig. 6, or to extended plunger-engaging position at one side of the wheel as shown at the bottom of said figure, for operating the plunger 174, or to the opposite side of the wheel, as shown in Fig. 1, for engaging and operating the plunger 175.

Although the crank shaft 7, for operating the knife, may be connected with the motor or source of power by any ordinary and well known or desired connecting and driving means, including shaft, gear and releasable clutch and clutch-operating mechanism adapted to enable the knife to be connected with and disconnected from the power-driven mechanism for operating the knife, all of which are well known and in common use in the art, a very simple and efficient means for accomplishing this purpose is shown in the accompanying drawings, as follows:

A spur gear wheel 9 is fixed to the crank shaft 7. And a toothed gear wheel 11′ is loose on a motor-driven shaft 10 which is rotatively mounted in suitable bearings in the opposite lower side frames of the machine, said gear 11′ being in toothed engagement with the gear 9. The shaft 10 is connected with the motor 10′ or source of power, by suitable gear and pedal-operated clutch mechanism: For example, a spur gear wheel 12′ is fixed to shaft 10 and in toothed engagement with a spur gear or pinion 13′ on or connected with and adapted to be driven by the motor shaft. And a clutch 14′, which may be of any ordinary and well known or suitable form, is keyed to and movable longitudinally of the shaft 10, and operatively connected with and adapted to connect the gear wheel 11′ with and disconnect the same from the shaft 10. The clutch 14′ is connected with and adapted to be operated by the usual pedal mechanism (not shown), for operating said clutch to operatively connect the knife-operating crank shaft 7 with and disconnect the same from the power-driven mechanism or motor and motor-driven shaft and gear mechanism above described, for enabling the knife to be operated intermittently, as desired.

We claim:

1. In a paper-cutting machine having a movable knife, knife-operating means and a feed-table, the combination of a movable paper-positioning gauge, movable gauge-stopping means adapted to operatively engage and release the movable gauge, for stopping and permitting the movement of the same, actuating means operatively connected with and adapted to move said movable gauge-stopping means into gauge-stopping position, detent mechanism acting to positively hold said movable gauge-stopping means in gauge-stopping position against the action of said actuating means, and means for automatically releasing said movable gauge-stopping means, to permit the operation of the same by said actuating means.

2. In a paper-cutting machine having a movable knife, knife-operating means and a feed-table, the combination of a movable paper-positioning gauge, movable gauge-stopping means comprising a series of gauge-stops adapted to successively engage and release the movable gauge, for stopping and permitting the movement of the same, power-driven actuating means for operating said movable gauge-stopping means, said actuating means comprising means for moving said gauge-stops into gauge-stopping position in successive order, detent mechanism adapted to positively hold said movable gauge-stopping means against said movement by said actuating means, and means for automatically releasing said movable gauge-stopping means, to permit the operation of the same by said actuating means.

3. In a paper-cutting machine having a movable knife, knife-operating means and a feed-table, the combination of a movable paper positioning gauge, rotative gauge-stopping means adapted to operatively engage and release the movable gauge, power-driven actuating means connected with and adapted to intermittently rotate said rotative gauge-stopping means through successive revolutions or partial revolutions progressively in the same direction, for moving the gauge-stops serially into gauge-stopping position, detent mechanism adapted to positively hold said movable gauge-stopping means against the said action of said actuating means, and means for automatically releasing said actuating means and movable gauge-stopping means to permit the operation of the latter by said actuating means.

4. In a paper-cutting machine having a movable knife, knive-operating means and a feed-table, the combination of a movable paper-positioning gauge, movable gauge-stopping means adapted to operatively engage and release the movable gauge, power-driven actuating means operatively connected with said movable gauge-stopping means and acting to move the same intermittently into gauge-stopping position, detent mechanism acting to positively hold said movable gauge-stopping means in gauge-stopping position against the action of said actuating means except when said gauge-stopping means is released from said detent mechanism, and automatic releasing means operatively connected with the knife-operating means and with said movable gauge-stopping means, for automatically releasing the latter, to permit the same to be operated by said actuating means.

5. In a paper-cutting machine having a movable knife, knife-operating means and a feed-table, the combination of a movable paper-positioning gauge, movable gauge-stopping means adapted to intermittently operatively engage and stop the movable gauge, power-driven gauge-stop actuating means adapted to automatically move said movable gauge-stopping means into gauge-stopping position progressively in repeated cycles of movement in the same direction, detent mechanism adapted to positively hold said movable gauge-stopping means in gauge-stopping position against the action of said actuating means except when said gauge-stopping means is released from said detent mechanism, and releasing means movable into and out of engagement with said detent mechanism, for automatically releasing the same at a given point in the cycle of movement of the knife, to permit the operation of the gauge-stopping means by said actuating means.

6. In a paper-cutting machine having a movable knife, knife-operating means and a feed-table, the combination of a movable paper-positioning gauge, movable gauge-stopping means adapted to operatively engage and release the movable gauge, actuating means adapted to intermittently move said movable gauge-stopping means progressively in successive repeated cycles of movement in the same direction, for stopping said gauge in different positions successively, detent mechanism adapted to positively hold said movable gauge-stopping means in gauge-stopping position against the action of said actuating means except when said gauge-stopping means is released from said detent mechanism, and releasing means connected with and adapted to be operated by the knife-operating means, for releasing the detent mechanism, to permit the operation of said movable gauge-stopping means by said actuating means.

7. In a paper-cutting machine having a movable knife, knife-operating means and a feed-table, the combination of a movable paper-positioning gauge, movable gauge-stopping means comprising a series of movable stops adapted to successively operatively engage and release the movable gauge, actuating means is operative engagement with said movable gauge-stopping means, means for connecting said actuating means with a source of power, detent mechanism adapted to stop and releasably hold said movable gauge-stopping means in gauge-stopping position against the action of said actuating means, and releasing means adapted to engage and automatically release said detent mechanism, for permitting the operation of the movable gauge-stopping means by said actuating means.

8. In a paper-cutting machine having a movable knife, knife-operating means and a feed-table, the combination of a movable paper-positioning gauge, movable gauge-stopping means comprising a series of gauge-stops mounted on a movable support and in adjustable relation to each other, said gauge-stops being movable into and out of position to successively operatively engage and release said movable gauge, power-driven actuating means in operative engagement with said movable gauge-stopping means, for operating the same, detent mechanism adapted to stop and releasably hold said movable gauge-stopping means in gauge-stopping position, and releasing means operatively connected with the knife-operating means and adapted to operatively engage and release said detent mechanism, for automatically releasing said gauge-stopping means, to permit the operation of the same by said actuating means.

9. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are adjustably mounted, means for rotating said gauge-stop supporting member, detent mechanism adapted to stop and positively hold said rotative gauge-stop supporting member against rotation, and releasing means operatively connected with the knife-operating means and adapted to operatively engage and release said detent mechanism, to automatically release and permit the operation of said movable gauge-stopping means.

10. In a paper-cutting machine having a movable knife, knife-operating means and a feed-table, the combination of a movable paper-positioning gauge, movable gauge-stopping means comprising a series of gauge-stops, a rotative gauge-stop supporting member upon which said gauge-stops are mounted in adjustable relation to each other, actuating means operatively connected with said rotative gauge-stop supporting member and adapted to be connected with a motor for driving said actuating means, detent mechanism operatively connected with said actuating means and with said rotative gauge-stop supporting member, for stopping and releasing said movable gauge-stopping means, and releasing means operatively connected with the knife-operating means and adapted to operatively engage and release said detent mechanism, for automatically releasing said gauge-stopping means, to permit the operation of the same by said actuating means.

11. In a paper-cutting machine having a movable knife, knife-operating means and a feed-table, the combination of a movable paper-positioning gauge, movable gauge-stopping means comprising a series of gauge-stops adapted to successively engage and release the movable gauge, for stopping and permitting the movement of the same, actuating means operatively connected with said movable gauge-stopping means and adapted to be connected with a motor, for operating said movable gauge-stopping means, pawl and ratchet mechanism operatively connected with said actuating means and with said movable gauge-stopping means, for stopping and releasably holding the latter in gauge-stopping position, and releasing means operatively connected with the knife-operating means and knife and adapted to operatively engage and release said pawl and ratchet mechanism, for automatically releasing said movable gauge-stopping means to permit the operation of the same by said actuating means.

12. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are mounted, actuating means operatively connected with said gauge-stop supporting member and adapted to be connected with a source of power for driving said actuating means, pawl and ratchet mechanism operatively connected with said actuating means and with said movable gauge-stopping means, for stopping the latter in gauge-stopping position, and tripping means operatively connected with and adapted to be operated by the knife-operating means and concurrently with the operations of the knife, for tripping said pawl and ratchet mechanism, to automatically release said movable gauge-stop supporting member, to permit the operation of the same.

13. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are mounted, actuating means operatively connected with said rotative gauge-stop supporting member and adapted to be connected with a motor, ratchet mechanism operatively connected with said actuating means and with said rotative gauge-stop supporting member, a pawl in operative engagement with and adapted to stop and release said ratchet mechanism, and tripping means operatively connected with said pawl and adapted to be operated by the knife-operating means concurrently with the movements of the knife, for tripping said pawl, to automatically release the ratchet mechanism and said rotative gauge-stop supporting member, to permit the operation of the latter by said actuating means.

14. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are mounted, actuating means operatively connected with said rotative gauge-stop supporting member, ratchet mechanism operatively connected with said actuating means and with said rotative gauge-stop supporting member, a pawl, for engaging and stopping and releasing said ratchet mechanism, a rocking member upon which said pawl is mounted, and a tripping member connected with the knife-operating means and movable upward and downward with the knife into and out of engagement with said rocking member, for releasing said pawl.

15. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are mounted, actuating means operatively connected with said rotative gauge-stop supporting member and adapted to be connected with a source of power for driving said actuating means, ratchet mechanism operatively connected with said rotative gauge-stop supporting member and with said actuating means, a pawl adapted to operatively engage said ratchet mechanism, for stopping and releasing the same, a rock shaft upon which said pawl is adjustably mounted, a tripping arm on said rock shaft, and a tripping member connected with the knife-operating means and movable upward and downward with the knife into and out of engagement with said tripping arm on said rock shaft, for releasing said pawl, to permit the rotation of the ratchet mechanism and said rotative gauge-stop supporting member.

16. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are mounted, actuating means operatively connected with said gauge-stop supporting member and adapted to be connected with a source of power for driving said actuating means, ratchet mechanism operatively connected with said rotative gauge-stop supporting member and with said actuating means, for stopping and releasing the movable gauge-stopping means, said ratchet mechanism comprising a series of toothed sections each having a different number of ratchet teeth, and a rotative ratchet-supporting shaft upon which said toothed ratchet-sections are mounted, a pawl adapted to operatively engage said ratchet mechanism, for stopping and releasing the same, a rock shaft upon which said pawl is adjustably mounted and adapted to be moved into position to operatively engage any desired predetermined toothed section of said ratchet mechanism, a tripping arm on said rock shaft, and a tripping member connected with the knife-operating means and movable upward and downward with the knife into and out of operative engagement with said tripping arm, for tripping and releasing the pawl, to permit the rotation of the ratchet mechanism and said rotative gauge-stop supporting member.

17. In a paper-cutting machine having a movable knife, knife-operating means and a feed table, the combination of a movable paper-positioning gauge, movable gauge-stopping means comprising a series of gauge-stops, a rotative supporting member upon which said gauge-stops are adjustably mounted, actuating means operatively connected with said rotative gauge-stop supporting member and adapted to be connected with a source of power, ratchet mechanism operatively connected with said rotative-stop-supporting member, for stopping and releasing the said movable gauge-stopping means, said ratchet mechanism comprising a series of ratchet teeth each corresponding with a predetermined gauge-stop on said rotative gauge-stop supporting member, a pawl adapted to operatively engage said toothed ratchet mechanism, for stopping and releasing the same, a rocking member upon which said pawl is mounted, and a tripping member connected with the knife-operating means and adapted to operate said rocking member to release said pawl, to permit the rotation of said ratchet mechanism and said rotative gauge-stop supporting member.

18. In a paper-cutting machine having a movable knife, knife-operating means and a feed-table, the combination of a movable paper-positioning gauge, movable gauge-stopping means comprising a series of gauge-stops, a rotative supporting member upon which said gauge-stops are adjustably mounted, actuating means operatively connected with said rotative gauge-stop supporting member and adapted to be connected with a source of power, ratchet mechanism operatively connected with said rotative stop-supporting member, for stopping and releasing said movable gauge-stopping means, said ratchet mechanism comprising a series of toothed ratchet sections each having a different number of teeth, the ratchet teeth on each section corresponding with the same number of predetermined gauge-stops on said rotative gauge-stop supporting member, a pawl adapted to operatively engage said toothed ratchet mechanism, for stopping and releasing the same, a rocking member on which said pawl is adjustably mounted and adapted to be moved into position to operatively engage and stop and release the teeth of any desired predetermined toothed section of said ratchet mechanism, to cause the corresponding predetermined gauge-stops on said rotative gauge-stop supporting member to be moved into and out of position to operatively engage and stop said movable gauge, in successive predetermined positions corresponding with said predetermined gauge-stops, and means for tripping said rocking member and pawl, to permit the rotation of said ratchet mechanism and said rotative gauge-stop supporting member.

19. In a paper-cutting machine having a movable knife, knife-operating means and a feed-table, the combination of a movable paper-positioning gauge, movable gauge-stopping means comprising a series of gauge-stops, a rotative cylinder on which said gauge-stops are adjustably mounted, ratchet mechanism comprising a toothed ratchet member, a rotative shaft upon which said toothed ratchet member is mounted, connected gear wheels mounted on and connecting said gauge-stop supporting cylinder and said rotative ratchet-supporting shaft, actuating means comprising shaft and gear mechanism connected with said ratchet mechanism and adapted to be connected with a motor-driven shaft, for rotating said ratchet-supporting shaft and said gauge-stop supporting cylinder intermittently, a pawl adapted to operatively engage said toothed ratchet member, for stopping and releasing the same, a rocking member upon which said pawl is supported, and tripping means operatively connected with the knife-operating means and adapted to operate said pawl-supporting rocking member, for releasing said pawl, to permit the rotation of said ratchet mechanism and said rotative gauge-stop supporting cylinder.

In witness whereof we have hereto attached our signatures this 3rd day of September, 1927.

EDWARD BRACKETT.
DIETRICH DANEKE.